United States Patent [19]

Mauch

[11] 4,033,595
[45] July 5, 1977

[54] HAND TRUCK

[76] Inventor: Floyd Mauch, 8245 Kirkwood Drive, Los Angeles, Calif. 90046

[22] Filed: May 5, 1976

[21] Appl. No.: 683,428

[52] U.S. Cl. .............................. 280/5.22; 280/47.2
[51] Int. Cl.² .......................................... B62B 5/02
[58] Field of Search ................ 280/5.2, 5.22, 28.5, 280/47.2; 74/128

[56] References Cited

UNITED STATES PATENTS

| | | | |
|---|---|---|---|
| 1,273,693 | 7/1918 | Tucker | 74/128 X |
| 2,793,868 | 5/1957 | Fuglie | 280/5.22 |
| 2,823,921 | 2/1958 | Lagaard | 280/5.2 |
| 3,064,990 | 11/1962 | Salvucci | 280/47.2 |
| 3,092,200 | 6/1963 | Chambers | 280/5.22 X |

Primary Examiner—Joseph F. Peters, Jr.
Assistant Examiner—R. Schrecengost

[57] ABSTRACT

The main frame of a hand truck is formed with support members on its rear lower side portions which extend angularly upwardly from the bottom thereof. Each of the support members has rollers on the upper and lower ends thereof which provide a track for an endless belt. A pair of movable handles slidably mounted on the sides of the frames are respectively connected to belt grippers on the endless belts. To move a loaded hand truck up a step, the frame is tilted back such that the endless belts contact the corner of a step. By pulling up on the movable handles the operator lifts the truck up the step with a mechanical advantage of two.

10 Claims, 15 Drawing Figures

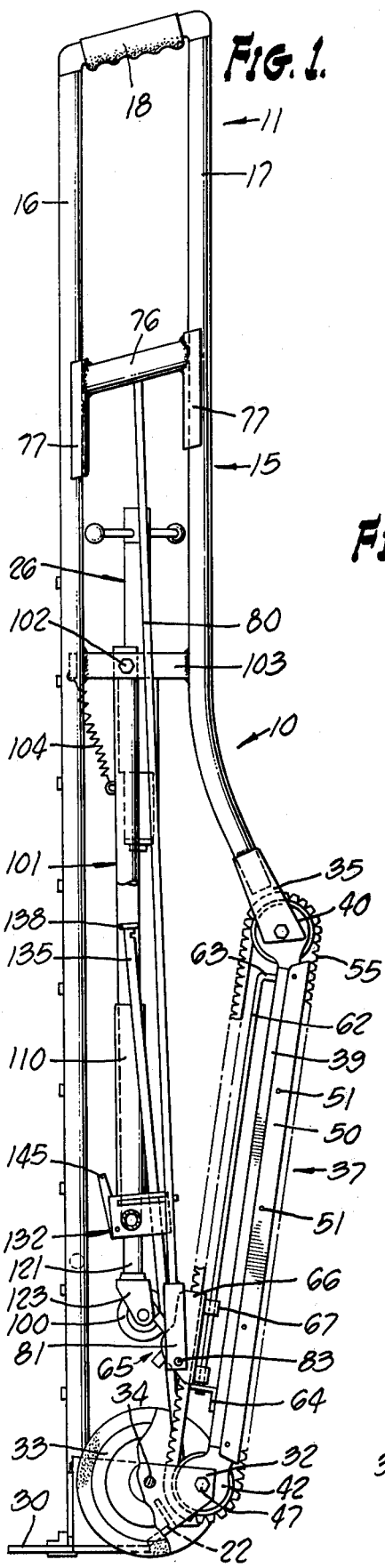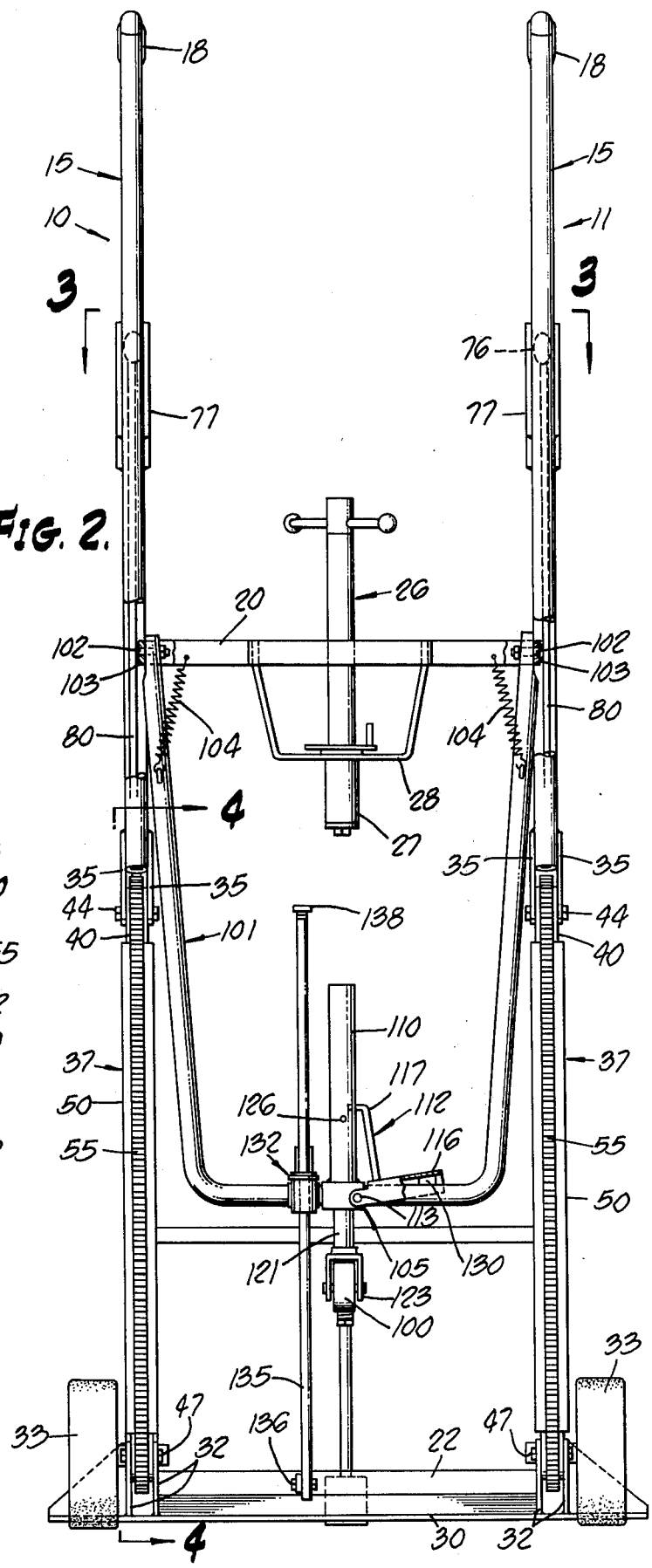

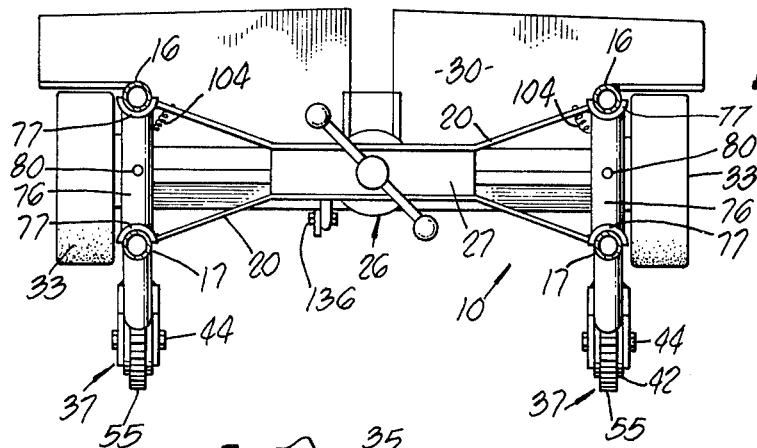
FIG. 3.
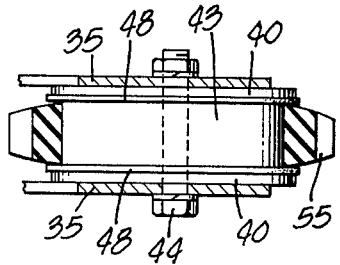
FIG. 5.
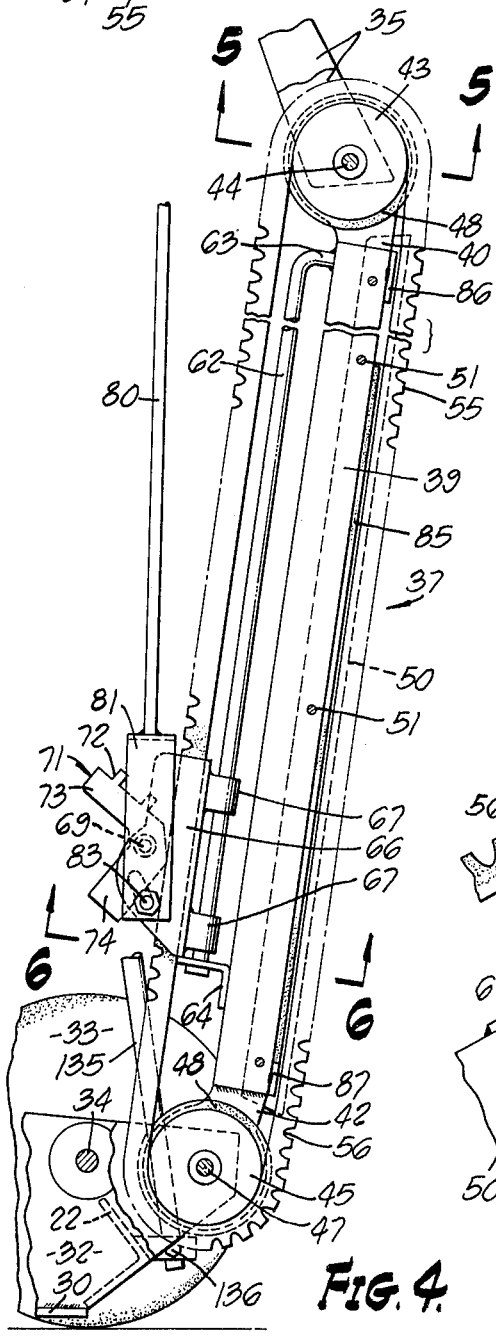
FIG. 4.
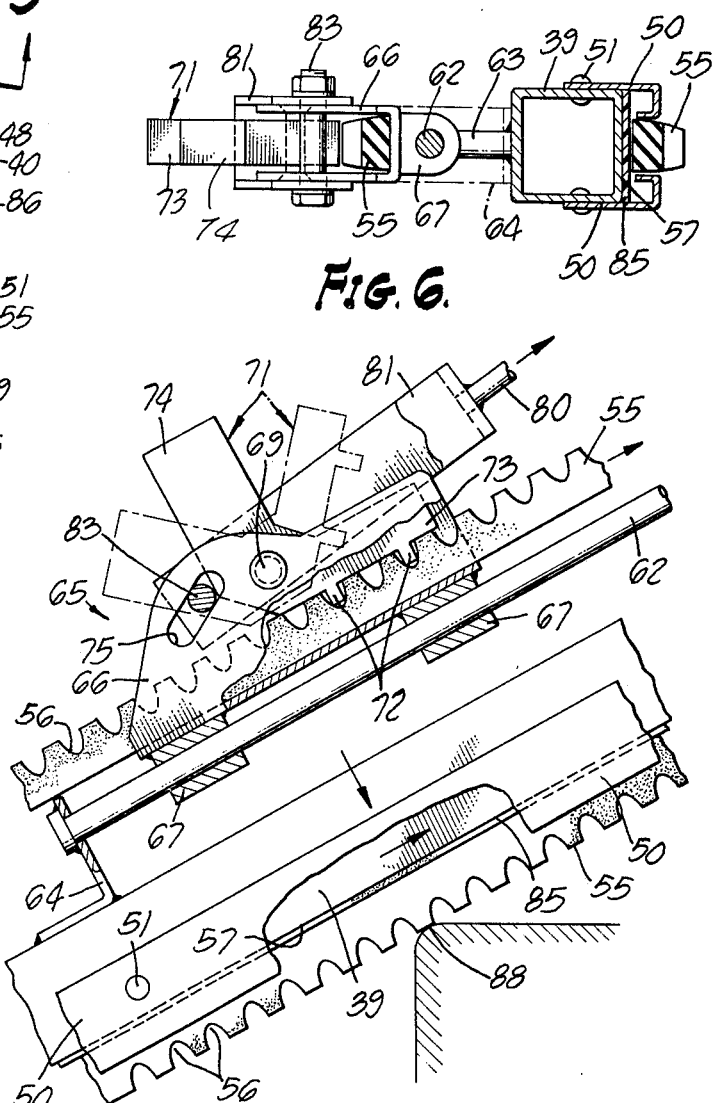
FIG. 6.
FIG. 7.

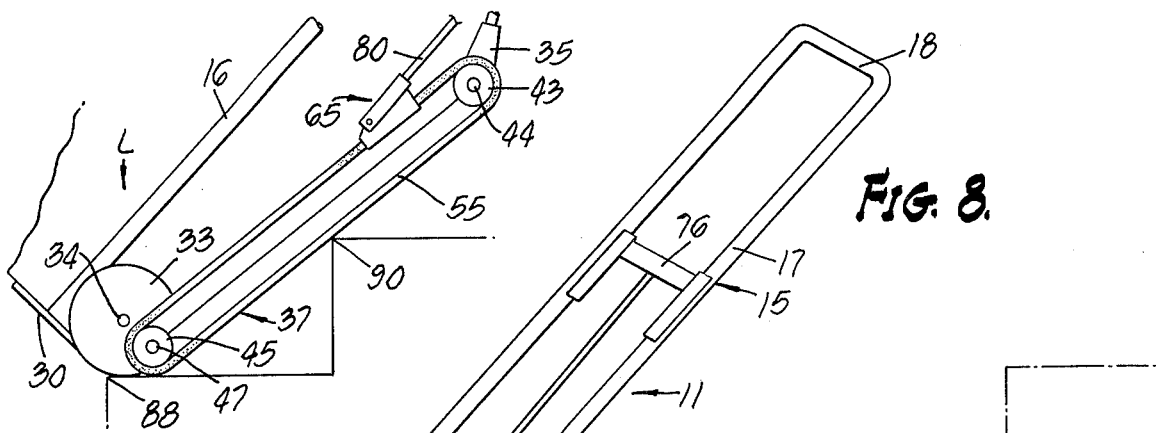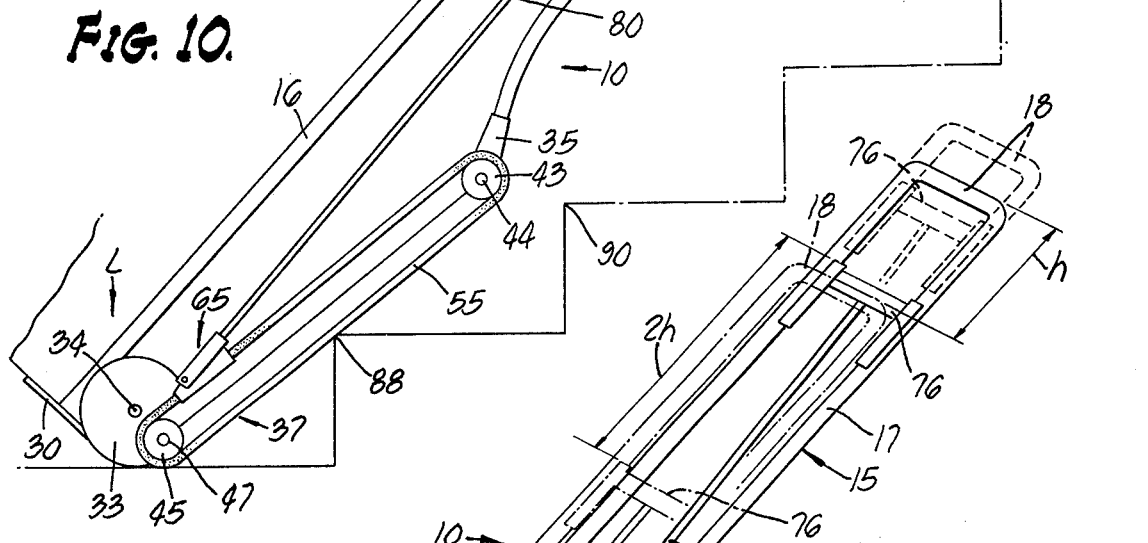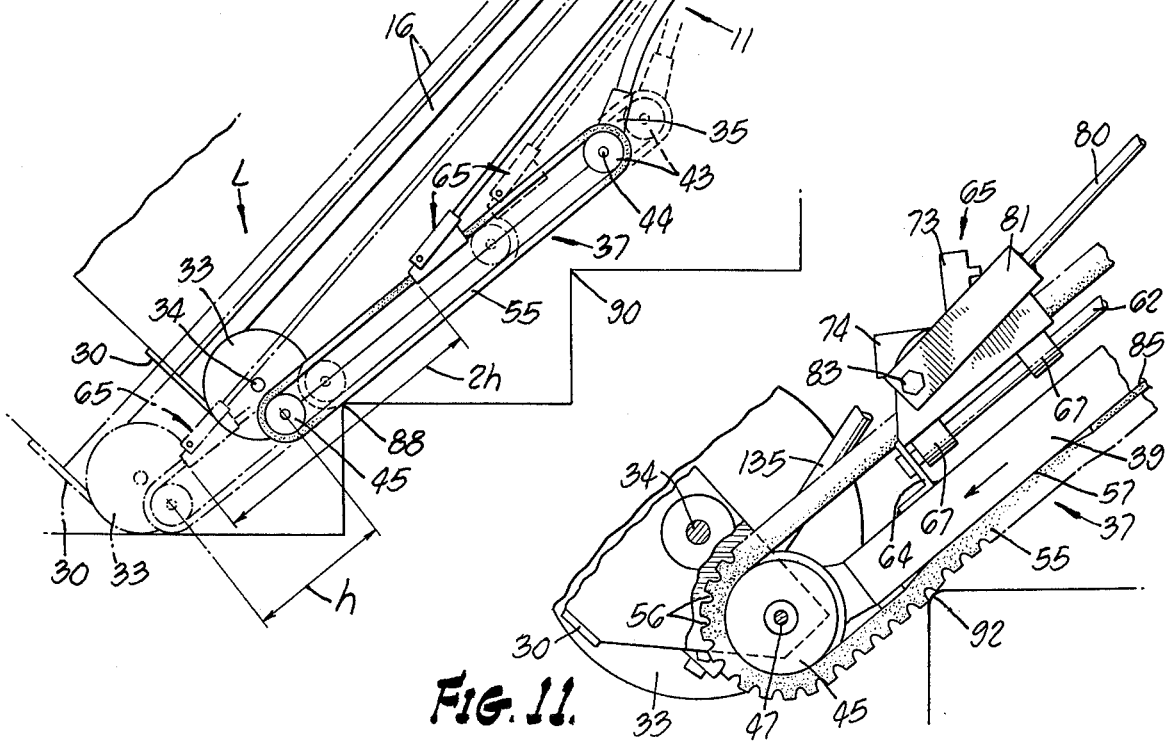

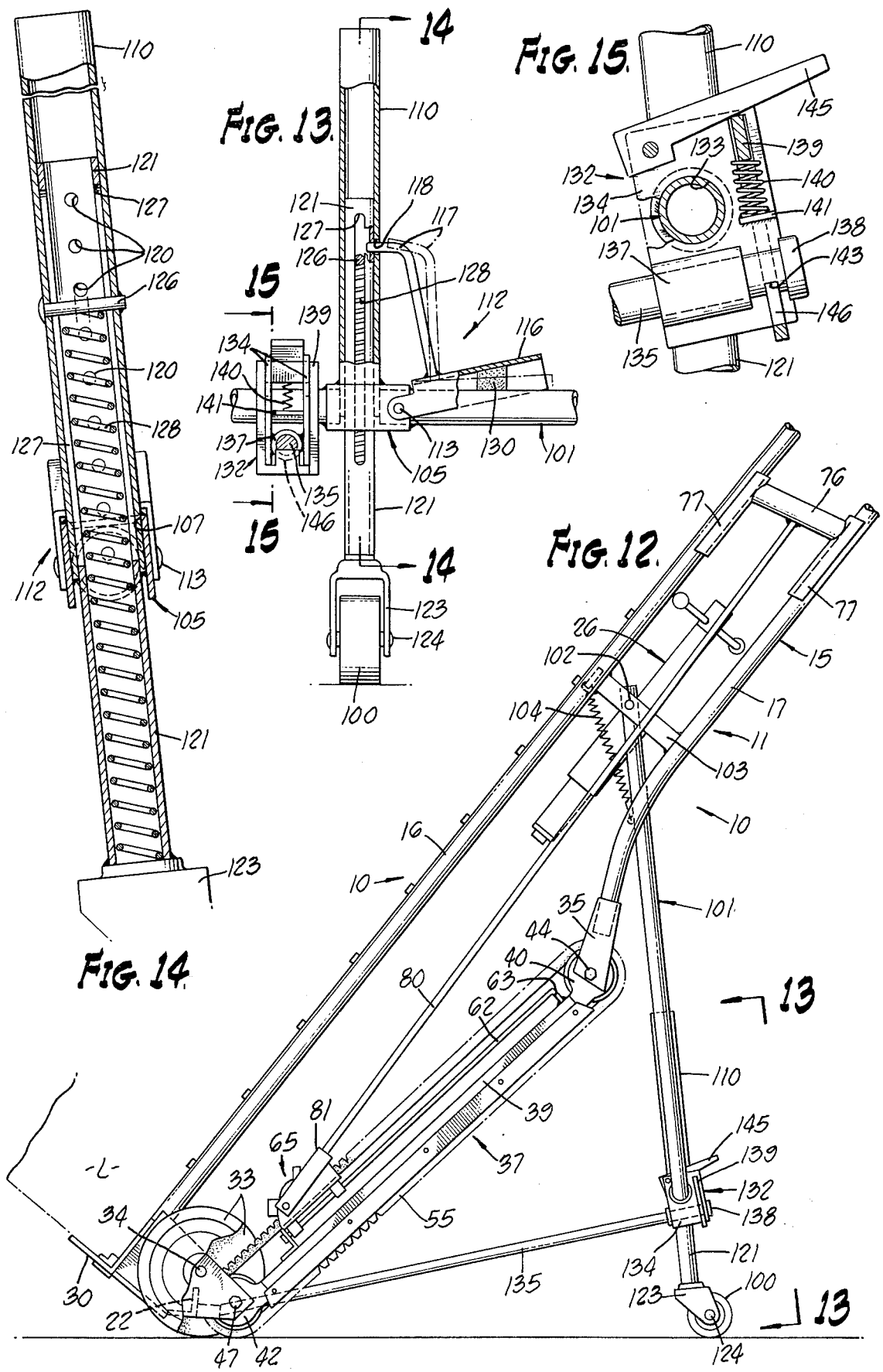

HAND TRUCK

This invention relates to hand trucks and more particularly to a hand truck provided with stair belt mechanisms for facilitating the moving of the hand truck with a load up and down stairs.

Stair climbers or rollers in the form of endless belts have previously been provided on the lower rear side portions of the main frame of a hand truck being used for handling heavy and bulky appliances having low centers of gravity.

The hand truck of the present invention is provided with improved endless belt mechanisms on the lower rear side portions thereof which in addition to protecting the stairs facilitate the moving of the hand truck with a load both up and down the stairs. Thus, the hand truck of the present invention provides for increasing the force with which the endless belts contact the corner of a step by shaping the lower rear side portions of the frame on which the endless belts are mounted such that they angle outwardly from the bottom of the frame. By such a construction, when the operator desires to move the hand truck either up or down the stairs, only a relatively small down tilt of the upper end of the frame about its supporting wheels is needed for the endless belts to contact the corner of a step of the stairs. Thus the normal component of the load which holds the endless belts against the corner of the step is large creating a large traction for the belts. Then, in order to make it easier for the surface of the supporting track to slip relative to the endless belts as required to lift the load, a freely held strip of material which has a self-lubricating characteristic, such as Teflon, is provided behind each of the endless belts.

To further assist the operator in lifting the load, i.e., in order to reduce the force needed to be applied by the operator to move the load upwardly, secondary handles are slidably mounted on the sides of the hand truck. The secondary handles are attached by rods to belt grippers provided on the front sides of the endless belts. The operator by pulling up on the secondary handles causes the front sides of the endless belts to be gripped and advanced about their tracks enabling the lower rollers for the endless belts to function as movable single pulleys which enable the hand truck to be moved up the stairs with a mechanical advantage of two.

In the lowering of the hand truck with a load down the stairs, the Teflon strips are initially behind the rear surfaces of the endless belts at the points where they contact the corner of the first step. As the frame moves down relative to the contact points of the endless belts the Teflon strips are held in position on the corner of the step by the belts. Thus as the endless belts advance downwardly and contact the corner of the next lower step, their points of contact are now directly against metal surfaces of the angular rear side supporting portions on the frame. This creates considerable friction between the belts and the track surfaces of the frame which provides a braking action that helps to ease the force with which the load is lowered down the stairs on the endless belts.

Another feature of the present invention is the providing of an auxiliary frame on the main frame for a third wheel which is adjustably mounted thereon. The auxiliary frame is provided with a radius rod whose inner end is pivotally attached to the lower end of the main frame. When the auxiliary frame is pulled outwardly it locks on the end of the radius rod. Such a construction enables the operator to place his foot on the cross-member of the auxiliary frame to thereby assist in tilting the load about the main support wheels.

In addition, the third wheel is spring loaded to extend below the auxiliary frame and its extension is made adjustable by a foot-operated lever which when depressed frees the spring loaded third wheel permitting it to extend downwardly. When as a result of balancing the load at a desired position the third wheel is pushed up against its spring, it can be held in that position by releasing the foot operated lever.

Accordingly, one of the objects of the present invention is to provide a stair belt mechanism on a hand truck which assists the operator in moving the truck with a load up and down stairs.

Another object of the present invention is to provide a hand truck having secondary movable handles on the sides of the frame thereof which are attached by grippers to endless belts mounted on lower rear angular portions of the frame to provide the operator with a mechanical advantage in lifting heavy loads upstairs.

Another object of the present invention is to provide stair belt mechanisms on lower rear side angular frame portions of the hand truck which function to provide an effective braking system when moving a load down stairs.

Aother object of the present invention is to provide stair belt mechanisms for a hand truck having strips of material with self-lubricating characteristics freely positioned behind the endless belts for facilitating the ability of the hand truck to climb stairs.

Still another object of the present invention is to provide an auxiliary frame for a third wheel arrangement which includes a radius rod that supports the auxiliary frame in an outward position and allows the operator to place this foot on the cross-member of the auxiliary frame to effectively help counterbalance the load while moving it to a desired location.

With these and other objects in view the invention consists of the construction, arrangement and combination of various parts of the device whereby the objects contemplated are attained as herein set forth, pointed out in the appended claims and illustrated in the accompanying drawings.

In the drawings:

FIG. 1 is a side elevational view of a hand truck which embodies the invention;

FIG. 2 is a rear view of the hand truck shown in FIG. 1;

FIG. 3 is a plan sectional view taken along line 3—3 of FIG. 2;

FIG. 4 is an enlarged view of the stair climbing mechanism;

FIG. 5 is a sectional view taken along line 5—5 of FIG. 4;

FIG. 6 is a sectional view taken along line 6—6 of FIG. 4;

FIG. 7 is an enlarged partial view of a stair climbing mechanism with its endless belts contacting the corner of a step;

FIG. 8 is a diagrammatic illustration showing the initial position of the hand truck being used to lift a load up the stairs;

FIG. 9 is a diagrammatic illustration similar to FIG. 8 but showing the relation of the movable handles and the endless belts relative to the frame when the load is being lifted;

FIG. 10 is a diagrammatic illustration showing the relation of an endless belt relative to the frame when the load has been lifted to the next higher step;

FIG. 11 is a view showing the endless belt gripped to its support to provide a braking action while lowering the hand truck with its load to the next lower step;

FIG. 12 is a side view of the hand truck shown in FIG. 1 with its third wheel support structure swung out to a position to balance the load;

FIG. 13 is a view of the third wheel support structure as taken along line 13—13 of FIG. 12;

FIG. 14 is a sectional view taken along line 14—14 of FIG. 13; and

FIG. 15 is a sectional view as taken along line 15—15 of FIG. 13.

Referring to the drawings, the hand truck 10 embodying the present invention includes a main frame 11 comprising a pair of transversely spaced sides 15 each formed of a front tubular member 16 and a rear tubular member 17 joined by an upper handle 18. The sides 15 of the frame are interconnected midway of the length thereof by upper cross-members 20 and near the bottom thereof by lower cross-members 22. A winch 26 provided with a cable (not shown) for securing a load on the truck is rotatably mounted in a cylinder 27 suspended below a bracket 28 centrally supported below the upper cross-members 20. A blade 30 for supporting the load is attached to the bottom of the lower cross-members 22. Journaled on shafts 34 extending from the outer sides of a pair of spaced upright plates 32 welded on either side of the cross-member 22 are support wheels 33.

The rear tubular members 17 on the sides of the main frame curve outwardly just below the upper cross-members 20 and a pair of angular plates 35 are welded on the sides of the lower ends thereof. A stair belt mechanism 37 is connected by its ends between the angular plates 35 and the pair of upright plates 32 on each side of the main frame. Each of the mechanisms 37 comprises an elongated support member 39 having a square cross-section, with a pair of spaced circular flanges 40 welded on the upper ends thereof and a pair of spaced circular flanges 42 welded on the lower ends thereof. The circular flanges 40 and 42 are arranged so that the metal back surface 57 of member 39 is substantially tangential therewith. An upper guide roller 43 is disposed between the pair of upper flanges 40 and a similar lower guide roller 45 is disposed between the pair of lower circular flanges 42. The upper and lower guide rollers 43 and 45 on the ends of the support members 39 together with the straight rear support surface 57 of the support member 59 provide a track for an endless belt 55.

Guide members 50 are held by rivets 51 on either side of the support members 39. The edges of the guide members are bent back on themselves about the rear support surface of the support member 39 and spaced apart to serve as a guide for the endless belt 55 and also as a retainer for a strip 85 of Teflon material.

A guide rod 62 extending parallel to the support member 39 has its upper end 63 curved inwardly and welded to the support member 39. The lower end of the guide rod 62 is supported on the member 39 by a bracket 64. Mounted on the guide rod is a belt gripper 65. Belt gripper 65 comprises a channel member 66 which is slidably mounted on the guide rod 62 by a pair of sleeves 67 attached to the rear surface thereof. Pivotally mounted on a pin 69 on the center of the channel member 66 is an L-shaped member 71 having teeth 72 on the outer side of one of its legs 73. An angular slot 75 is provided on the lower portion of the channel member 66.

As shown for the upper guide rollers 43 in FIG. 5, Teflon washers 48 are provided between the sides of each of the rollers and the sides of the circular flange. The upper circular flanges 40 with teflon washers 48 and upper guide rollers 43 are inserted between the pair of angular plates 35 and held by a bolt 44 on which the upper roller 43 is journaled. Similarly, the lower circular flanges 42 with Teflon washers 48 and lower guide roller 45 are inserted between the pair of upright plates 32 and held together by a bolt 47 on which the lower guide roller 45 is journaled. It should be noted that the stair belt mechanisms 37 extend upwardly and angularly outwardly from the lower end of the frame at an angle of approximately 10 degrees from the vertical.

Each side 15 of the hand truck frame 11 is provided with a movable secondary handle 76 having arcuate sides 77 slidably mounted on the tubular members 16 and 17 thereof. A rod 80 extends down from the middle of the movable handle 76. A clevis 81 is attached to the bottom of the rod 80. A lifting pin 83 extends across the lower end of the clevis 81 and through the angular slot 75 provided on the channel member 66.

Normally each secondary movable handle 76 is in its lower position on each side of the main frame with its rod 80 and consequently the clevis 81 on the lower end thereof in such a position that the lifting pin 83 is in the lower end of the angular slot 75. When in this position the L-shaped member 71 is rocked about pin 69 by gravity acting on its heavy leg 74 such that the teeth 72 upon the outer surface of its lighter leg 73 are disengaged from the grooves 56 on the endless belt 55. Thus the endless belt is permitted to move freely in either direction along its track.

When the hand truck 80 is used to lift a load up the stairs, the secondary handles 76 are pulled upwardly by the operator relative to the sides 15 of the main frame. this causes cleves 81 to move their lifting pins 83 along the angular slots 75 such as to rotate the L-shaped members 71 about their pivot pins 69. As a result, the teeth 72 on the sides of the lighter legs 73 engage the grooves 56 on the sides of the endless belts 55 and pull the belts upward causing them to advance about their respective tracks.

The Teflon strip 85 positioned between the rear surface of each of the endless belts 55 and the adjacent metal support surface 57 on the rear of the support member 39 is approximately two-thirds the length of the support member 39. The strip 85 is sufficiently loosely held behind the endless belt 55 such that its lower end normally rests against a lower stop 86 just above the lower guide roller 45. Thus, since the endless belts are lying against the corner of the step 88 (FIG. 7) when the stair belt mechanisms 37 are being used for climbing stairs, the Teflon strips 85 act as a lubricant in that they enable the surfaces 57 of the support members 39 to slip relative to the endless belts 55 as needed to facilitate lifting the load up the stairs. It should be noted that the downward tilt of the main frame by the operator causes the endless belts on the outwardly angled support members 39 to contact the corner of a step at such an angle, e.g., approximately 40 degrees with respect to the horizontal, that a large normal component of force is exerted by the load L on the corner. Such a normal force would ordinarily create a considerable frictional force between the endless belts and the metal surfaces of the support members 39 were it not for the Teflon strips 85. The large normal force is, of course, very helpful and necessary to provide traction needed to hold the belts up against the corner of the step.

It should now be clear from FIG. 8 that when a load L on the hand truck is to be carried upstairs, the operator lowers the upper end of the sides 15 of the main frame such that the endless belts 55 contact corner 88 of the first step of the stairs. Because the endless belts 55 are mounted on rear lower support members 59 which are disposed upwardly from the bottom of the main frame at an outward angle relative to the front thereof, the upper end of the main frame does not have to be tilted as far down for the endless belts to contact the corner of the step. This makes it more convenient for the operator to handle the truck while he is in an upright position.

This initial position of the hand truck with the wheels 14 contacting the floor below the first step, as shown in FIG. 8, is indicated in phantom lines in FIG. 9. At this instance, in addition to the endless belts 55 on the sides of the frame making contact with the corner 88 of the first step, the belt grippers 65 are at their lowest position just above the periphery of the wheels 33 and the movable handles 76 at their lowest position in relation to the sides 15 of the main frame.

As the secondary handles 76 are moved up by the operator to a position indicated by solid lines in FIG. 9, the hand truck with its load L is pulled up the stairs a distance $h$. Note that in order to accomplish this the portion of each endless belt 55 between its corner contact point 88 on the step and the lower roller 45 is shortened by a distance $h$. Likewise the portion of each endless belt 55 opposite the just described portion of the endless belt gets shortened by the distance $h$. Thus in order to raise the hand truck along a distance $h$, the belt grippers 65 must move a distance $2h$, as indicated, and consequently the secondary handles 76 must also be moved a distance $2h$. But, since the hand truck is being moved upwardly, a distance $h$, as indicated, the secondary handles 76 move up only a distance $h$ relative to the sides 15 of the main frame 11.

The dashed lines in FIG. 9 indicate the position of the main frame 11 of the truck and the location of the secondary handles 76 thereon when the hand truck with its load has been lifted to the point where the lower rollers 45 are opposite the corner 88 of the step.

FIG. 10 illustrates the hand truck after it has been moved upward around the corner 88 of the first step and its endless belts 55 are in contact with the corner 90 of the next higher step. Note that the belt grippers 65 have not yet been pushed down relative to the endless belts as needed to regrip the endless belts as needed to lift the hand truck up this next higher step.

It should now be clearly understood that by use of the secondary handles 76 which grip the sides of the endless belt 55, the lower roller 45 on each of the stair belt mechanism 37 function as a single movable pulley. Note that during the lifting action produced by applying a force to the secondary handles 76, each of the endless belts 55 grips the corner 88 of the step and is held so that the point of the belt in contact with the corner does not move relative thereto. Note further that the angle with which the stair belt mechanism 37 is mounted on the frame assists in providing the necessary traction to enable the endless belts to be so held.

It should now be clearly understood that to move the loaded hand truck a distance $h$ upstairs, each of the two supporting portions of the endless belts 55 about their respective lower rollers must be shortened by the amount $h$. This result is brought about by moving the applied force F on the movable handles 76 a distance equal to $2h$. That is, moving the secondary handles 76 a distance $s=2h$ makes $s/h=2$ which is the theoretical mechanical advantage of the system.

The lower guide rollers 45 for the endless belts 55 on each side of the frame are located on the lower ends of the main frame adjacent to the wheels 33. Thus, when the main frame is tilted downwardly so that the stair belt mechanisms 37 on the rear lower portions of its sides contact the stairs, the curvature of the endless belt 55 is offset only a short distance from the curvature of the wheels 33. This location of the lower ends of the endless belts 55 provides for a smooth transition from the endless belts 55 to the wheels 33 when climbing the stairs (FIG. 10) and from the wheels 33 to the belts when moving the load down stairs.

Note that the secondary handles 76 can be moved approximately 12 inches, for example, relative to the sides of the main frame as the operator moves up stairs and pulls the main frame itself twelve inches. Thus in this way the load is lifted up from one step to the next by one continuous pulling action by the operator of the secondary handles 76.

The operator, by pushing down on the secondary handles 76 moves the cross-pins 83 on the cleves 81 down on the angular slot 75 on the members 66. This permits the heavy arms 74 of the L-shaped members 71 to rock the latter about pins 69 and thereby pull the teeth 72 of lighter arms 73 out of the grooves 56 on the endless belts 55. This enables members 66 of the belt grippers 37 to slip on the guide rods 62 down to their lowermost positions on the endless belts 55 adjacent the wheels 33 so that they are in position to grip the endless belts 55 for another upward movement of 24 inches as needed for the next higher step of the stairs.

Next to be described in connection with FIG. 11 is the manner in which the stair belt mechanisms 37 operate to assist the operator in lowering a load down the stairs. In this instance, instead of desiring a lubricating action between the endless belts 55 and the support members 39 in the form of the Teflon strips 85, it is desired to have added friction, i.e., provide a braking action to assist in lowering the load. When the hand truck is tilted downwardly the endless belts 55 on the lower rear sides of the main frame engage the corner of a step. Thus as the hand truck moves downwardly, the Teflon strips 85 are caused to be held with the endless belts against the corner of the first step (not shown) as the support member 39 slides down past the corner. Thus when the endless belts travel down and make contact with the corner 92 of the next lower step, as shown in FIG. 11, they make direct contact with the metal surfaces 57 of the support members 39 to create friction proportional to the load to assist the operator in lowering the load down to the next lower step.

Referring next to FIGS. 12 through 15, a description will be presented of the third wheel support mechanism on the hand truck 10 which is used for assisting the operator in balancing and manipulating the truck when it has a load thereon. The third wheel support mechanism comprises a U-shaped auxiliary tubular frame 101 which has its free end hinged by bolts 102 to crossbraces 103 forming a part of the middle support members 20 on either side of the main of the middle support members 20 on either side of the main frame. The auxiliary frame 101 is normally held in a folded position, i.e., a position parallel to front tubular member 16 of the main frame by springs 104. A joint 105 having a square cross-section with an open bottom has the inner ends of the auxiliary frame welded on either end thereof. An upright tube 110 extends down into a central hole 107 on the top of the point 105 and is welded into position. Telescopically fitted in the bottom of the tube 110 is an inner tube 121. A clevis 123 is attached to the lower end of the inner tube. The third wheel 100 is rotatably supported in the clevis on pin 124.

A cross-pin 126 secured on the upper portion of the tube 110 passes through elongated slots 127 provided on either side of the inner tube 121. A spring 128 within the inner tube 121 has its upper end in contact with the cross-pin 126 and its lower end in contact with a shoulder on the lower end of tube 121. Thus the spring 128 normally acts to force the inner tube 121 out of the tube 110, i.e., it extends the inner tube relative to the auxiliary frame 101.

Pivotally mounted by pin 113 to the joint 105 is an L-shaped member 112 comprising a horizontal lever 116 and a vertically disposed arm having a finger 117 on the end thereof. The finger 117 extends through an opening 118 in the tube 110 and engages one of a series of holes 120 on the inner tube. The finger is held in position by a piece of sponge rubber 130 located below the horizontal lever 116 positioned above the transverse portion of the auxiliary frame 101.

The radius rod 135 provides for supporting and locking the auxiliary frame 141 in its outwardly swung operative position. A coupler 132 comprised of a pair of spaced plates 134 held together at one side by a horizontal member 141 is provided for joining the transverse portion of the auxiliary frame to the radius rod 135. Coupler 132 is provided with transverse bearing holes 133 on plates 134 through which the transverse portion of the auxiliary frame 101 extends. The radius rod 135 whose inner end is pivotally mounted by bolts 136 to the lower cross-members 22 of the main frame extends up through an opening in an inner hub portion 137 provided between plates 134 which opening is transverse to the bearing holes 133 provided for the auxiliary frame 101. Thus the coupler 132 is pivotally mounted on the auxiliary frame 101 and the radius rod 135 is slidable relative to the coupler 132. The radius rod has a head 138 on the end thereof which prevents it from slipping out of the coupler 132.

Slidably mounted on one end of the coupler 132 is a plate 139 which is held and urged upwardly by a spring 140 contacting the horizontal member 144. When the auxiliary frame 101 is swung out to the end of the radius rod 135, the key 146 on the lower end of plate 139 engages a slot 143 on the radius rod 135, thus locking the auxiliary frame in position thereon. To release the radius rod 135, a foot pedal 145 pivotally mounted on the upper end of plates 134 is depressed causing the key 146 on the lower end of the plate 139 to move out of the slot 143 on the radius rod 135. Note the arrangement enables the auxiliary frame to be both folded against the main frame or unfolded, i.e., swung out, by use of the operator's foot, thus leaving his hands free to control the load.

When the operator uses his foot to swing the auxiliary frame 101 out from the main frame, the key 146 in coupler 132 locks the auxiliary frame in position on the outer end of the radius rod 135. The operator by placing his foot on the horizontal lever 116 rotates the L-shaped member 112 to pull the finger 117 out of the hole 118 on the inner tube 121. This causes the spring 128 to urge down the inner tube 121 with the third wheel 100 on the lower end thereof. The operator then by merely tilting the truck about the wheels 33 and holding it so that the load is balanced, can cause the inner tube 121 to be telescoped into the tube 110 the desired amount such that the third wheel 100 is in position to support the load. The third wheel 100 is locked in its extended position by releasing the lever 116 which causes the finger 117 to engage one of a series of holes 120 in the inner tube 121.

While the invention shown and described herein has been well adapted to fulfill the objects and advantages previously mentioned as desirable, it is to be understood that the invention is not limited to the specific features shown or described but that the means and configuration herein disclosed are susceptible of modification in form, proportion and arrangement of parts without departing from the principle involved or sacrificing any of its advantages and the invention is therefore claimed in the embodiments of various forms while coming within the scope of the claims which follow.

I claim:

1. A hand truck comprising:
   a frame having wheels mounted on the bottom sides thereof, said frame having lower rear side support members extending angularly outwardly from the bottom thereof, each said side support members having rollers on the upper and lower ends thereof to provide a track,
   an endless belt on each of the tracks provided by said support members,
   a pair of handles slidably mounted on the sides of said frame,
   belt grippers on the endless belts, and
   connecting means for respectively connecting said pair of slidable handles to said pair of belt grippers, whereby when said frame is tilted about its wheels such that the rear portion of the endless belts on said support members make contact with a corner of a step and said slidable handles are pulled upwardly the belt grippers grip and pull up on the front portions of the endless belts to cause the lower rollers to operate as single movable pulleys to lift the truck up the step with a mechanical advantage of two.

2. The invention in accordance with claim 1 including strips of material having self-lubricating characteristics freely disposed between the surfaces of the side support members and the endless belts.

3. The invention in accordance with claim 1 wherein said lower rollers are located adjacent said wheels so as to provide for a smooth transition from the wheels to the endless belts when the truck is being lowered down the step and from the endless belts to the wheels when the truck is being pulled to climb the step.

4. The invention in accordance with claim 1 wherein said belt grippers are slidable on guide rods extending along the front of the support members, and said belt grippers are provided with teeth which engage the endless belts when the movable handles are pulled up and which disengage therefrom when the movable handles are pushed down by the operator.

5. The invention in accordance with claim 1 including an auxiliary frame pivotally mounted to the sides of the main frame, said auxiliary frame having telescopically adjustable tubular means attached on transverse portions thereof, said tubular means having a third wheel mounted thereon, and a radius rod having its inner end hinged to the bottom of the frame and its outer end slidably mounted in a coupler on the transverse portion, said coupler including means for locking the outward end of said radius portion rod in operative position, whereby when said auxiliary frame is swung outwardly the operator can place his foot on the transverse portion of the auxiliary frame to help balance the load.

6. The invention in accordance with claim 1 wherein said lower rear side support members extend angularly outwardly from the bottom thereof at an angle of approximately 10° from the vertical.

7. The invention in accordance with claim 2 wherein the length of said strips is approximately two-thirds the length of said support members.

8. The invention in accordance with claim 7 wherein said strips are formed of Teflon material.

9. The invention in accordance with claim 1 wherein said connecting means are rods.

10. A hand truck comprising:
a frame having wheels mounted on the bottom sides thereof, said frame having lower rear side support members extending angularly outwardly from the bottom thereof, each said side support members having rollers on the upper and lower ends thereof to provide a track,
an endless belt on each of the tracks provided by said support members,
strips of self-lubricating material freely disposed between said endless belts and said support members, said strips having a length approximately two-thirds the length of the support members, and
stops provided near the lower ends of said support members against which said strips normally rest,
whereby when said frame is positioned with the endless belts on said support members in contact with a corner of a first step of stairs up which the truck is to be pulled said strips are disposed behind said endless belts at their points of contact and are continually pushed upwardly by the lower stops on the support members as the truck is raised so that when the endless belts contact the corners of successively higher steps the strips remain disposed behind the endless belts to function as a lubricant for the support members sliding upwardly relative to the endless belts, and
whereby when said frame is positioned with the endless belts on said support member in contact with a corner of a first step of stairs down which the truck is to be lowered, said strips are disposed behind said endless belts and are initially held against the corner of the first step as the truck is lowered so that when the endless belts contact the corners of successively lower steps the endless belts are in direct contact with the support members so as to produce a braking action on the support members sliding downwardly relative to the endless belts.

* * * * *